Feb. 14, 1956   O. B. HANNAH   2,734,305
LIVE BAIT BUCKET
Filed Jan. 8, 1954
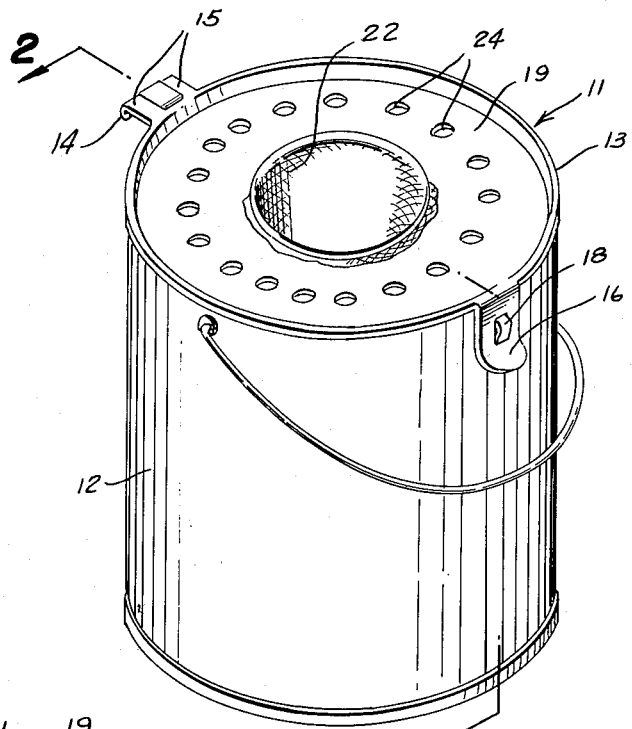
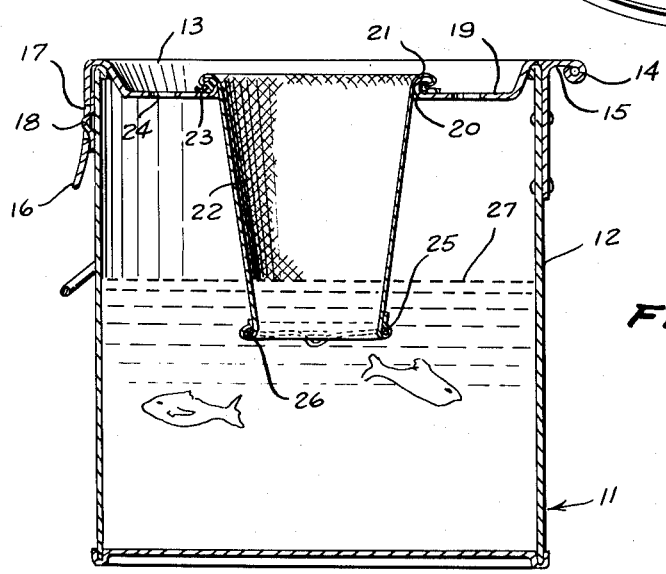
INVENTOR.
OTTIS B. HANNAH
BY
McMorrow, Berman & Davidson
ATTORNEYS

United States Patent Office 2,734,305
Patented Feb. 14, 1956

2,734,305

LIVE BAIT BUCKET

Ottis B. Hannah, Lakeland, Fla.

Application January 8, 1954, Serial No. 402,998

2 Claims. (Cl. 43—56)

This invention relates to fishermen's equipment, and more particularly to an improved receptacle for live bait.

The main object of the invention is to provide a novel and improved live bait bucket which is simple in construction, which is arranged to provide easy access to the bait contained therein for the removal of the bait, and which is further arranged so that the bait cannot readily escape from the bucket, while being provided with air.

A further object of the invention is to provide an improved live bait receptacle which is inexpensive to manufacture, which is sturdy in construction, which is provided with improved means for placing bait in the receptacle and for removing bait therefrom whenever required, and which is further arranged so that a quantity of ice may be suspended in the container, furnishing refrigeration when required.

Further objects and advantages of the invention will become apparent from the following description and claims, and from the accompanying drawings, wherein:

Figure 1 is a perspective view of an improved live bait container constructed in accordance with the present invention.

Figure 2 is a vertical cross sectional view taken on the line 2—2 of Figure 1.

Referring to the drawings, the improved bait bucket is designated generally at 11 and comprises a cylindrical main rigid and imperforate container 12 provided with a cover 13 hinged at 14 to hinge bracket elements 15 secured to the upper portion of the main container 12. Diametrically opposite the hinge 14, the cover 13 is provided with a depending resilient locking tongue 16 which is formed with a locking aperture 17 interengageable with an outwardly projecting detent 18 rigidly secured to the upper portion of the outer surface of the main container 12. As will be readily apparent from Figures 1 and 2, the resilient arm 16 will lockingly receive the outwardly bowed detent 18 in the aperture 17 to releasably secure the cover 13 on the top rim of the main container 12. When desired, the cover 13 may be opened by flexing the resilient arm 16 outwardly and lifting same, to raise the arm away from the projection 18.

The cover 13 is downwardly offset inwardly of its rim portion, as shown at 19, and is formed with a relatively large central aperture 20, said aperture being of a sufficient size to freely allow the passage of a human hand therethrough. The aperture 20 is provided with the annular, outwardly facing, channeled rim 21. Designated at 22 is a downwardly tapering sleeve-like member of flexible, porous material, such as fabric or the like, the top marginal portion of the downwardly tapering sleeve 22 being engaged around and received in the annular channeled member 21 and being secured therein by a resilient snap ring 23 which clamps the upper marginal portion of the sleeve-like member 22 against the inside surface of the annular channel member 21.

Obviously, the member 23 may be a rubber band or other elastic clamping member adapted to clampingly hold the flexible material of the member 22 against the inside surface of the annular channel member 21.

The cover 13 is formed in its downwardly offset portion 19 with the circularly arranged series of ventilating apertures 24 located around the sleeve-like flexible member 22.

The lower margin of the flexible member 22 is formed with the hem 25 in which is disposed a drawstring 26 which may be employed at times to constrict the lower end of the sleeve-like member 22, as when it is desired to support a quantity of ice in the sleeve-like member to provide refrigeration in the container while at the same time allowing oxygen to pass into the container through the sleeve-like member, without danger of injuring the live bait in the container.

Normally, the receptacle 12 contains a quantity of water in which the live bait may swim, the bait being accessible for the removal thereof through the sleeve-like member 22 which, as shown in Figure 2, extends a substantial distance below the surface 27 of the water in the container. Bait may be removed from the container by inserting the hand through the sleeve-like member, since as above explained, the aperture 20 is sufficiently large to allow the free passage of a human hand therethrough. Conversely, live bait may be placed in the container through the sleeve-like member 22, since the sleeve-like member 22 extends a sufficient distance downwardly below the surface 27 of the water to prevent the live bait in the container from escaping from the container.

As above explained, when it is desired to refrigerate the container, the drawstring 26 may be employed to constrict the lower end of the sleeve-like member 22, allowing ice to be supported in the sleeve-like member to refrigerate the interior of the container.

By providing the depending sleeve-like member 22, it is not necessary to open the closure member 13 whenever it is desired to remove bait from the container, thus preventing escaping of the live bait.

The sleeve-like member 22 may be of any suitable flexible porous material, such as cloth made of nylon, cotton, or any other suitable fabric material, and the member 22 is of sufficient length to prevent shiners, frogs, crickets, or other live bait from jumping up through the hole 22 in the closure member 13. At the same time, the large opening 22 provides increased space for the admission of air into the interior of the container, thus tending to keep the bait in better condition than in the live bait receptacles of the prior art.

The opening 20 may be of any desired shape, such as round, square, or the like, and the container 12 and the lid 13 may be made of any suitable rigid material, such as sheet metal, plastic material, or the like.

While a specific embodiment of an improved live bait container has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a live bait bucket, an imperforate rigid container having an open upper end, a cover closing said upper end, said cover having a central opening, and a flexible and porous sleeve having an open upper end secured to the cover around said opening and depending into the container, said cover being engaged with the upper end of the container and being hinged to one side of the container.

2. In a live bait bucket, an imperforate rigid container having an open upper end, a cover closing said upper end, said cover having a central opening, and a flexible and porous sleeve having an open upper end secured to the cover around said opening and depending into the container, said cover having air holes around said opening and being otherwise imperforate.

References Cited in the file of this patent

UNITED STATES PATENTS

| | | |
|---|---|---|
| 595,685 | Abraham | Dec. 21, 1897 |
| 756,097 | Burroughs | Mar. 29, 1904 |
| 758,966 | Hall | May 3, 1904 |
| 1,526,822 | Backer | Feb. 17, 1925 |
| 2,188,299 | Huerta et al. | Jan. 30, 1940 |

FOREIGN PATENTS

| | | |
|---|---|---|
| 818,086 | France | June 7, 1937 |